(12) United States Patent
Sathish et al.

(10) Patent No.: US 8,812,499 B2
(45) Date of Patent: Aug. 19, 2014

(54) METHOD AND APPARATUS FOR PROVIDING CONTEXT-BASED OBFUSCATION OF MEDIA

(75) Inventors: Sailesh Kumar Sathish, Tampere (FI); Sujeet Shyamsundar Mate, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/307,479

(22) Filed: Nov. 30, 2011

(65) Prior Publication Data
US 2013/0138693 A1 May 30, 2013

(51) Int. Cl.
*G06F 7/00* (2006.01)
*G06F 17/30* (2006.01)
*G06F 15/16* (2006.01)

(52) U.S. Cl.
USPC .................. 707/733; 707/784; 707/913

(58) Field of Classification Search
USPC .......................... 707/733, 784, 913
See application file for complete search history.

(56) References Cited

U.S. PATENT DOCUMENTS

| 7,386,542 | B2* | 6/2008 | Maybury et al. .............. 707/733 |
| 2002/0157095 | A1 | 10/2002 | Masumitsu et al. |
| 2006/0212900 | A1 | 9/2006 | Ismail et al. |
| 2008/0019661 | A1 | 1/2008 | Obrador et al. |
| 2008/0028002 | A1* | 1/2008 | Barkeloo et al. .............. 707/201 |
| 2008/0313541 | A1* | 12/2008 | Shafton et al. ................ 715/725 |
| 2009/0313546 | A1 | 12/2009 | Katpelly et al. |
| 2010/0023544 | A1* | 1/2010 | Shahraray et al. ............ 707/102 |
| 2010/0036808 | A1* | 2/2010 | Lee ................................. 707/3 |
| 2010/0246944 | A1 | 9/2010 | Yang et al. |

OTHER PUBLICATIONS

International Search Report for related International Patent Application No. PCT/FI2012/050997 dated Jan. 29, 2013, pp. 1-5.
Written Opinion for related International Patent Application No. PCT/FI2012/050997 dated Jan. 29, 2013, pp. 1-8.

* cited by examiner

*Primary Examiner* — Greta Robinson
*Assistant Examiner* — Brian E. Weinrich
(74) *Attorney, Agent, or Firm* — Ditthavong Mori & Steiner, P.C.

(57) ABSTRACT

An approach for sharing and/or viewing one or more remixes of content based on the preferences of a user is described. A segmentation platform causes, at least in part, a segmentation of content into one or more segments, wherein the one or more segments are associated with one or more content labels. The segmentation platform also causes, at least in part, a rendering and/or sharing of one or more remixes of the content based, at least in part, on at least one subset of the one or more segments based, at least in part, on profile information, context information, or a combination thereof associated with one or more viewers of the content, one or more owners of the content, one or more sharers of the content.

18 Claims, 13 Drawing Sheets

100

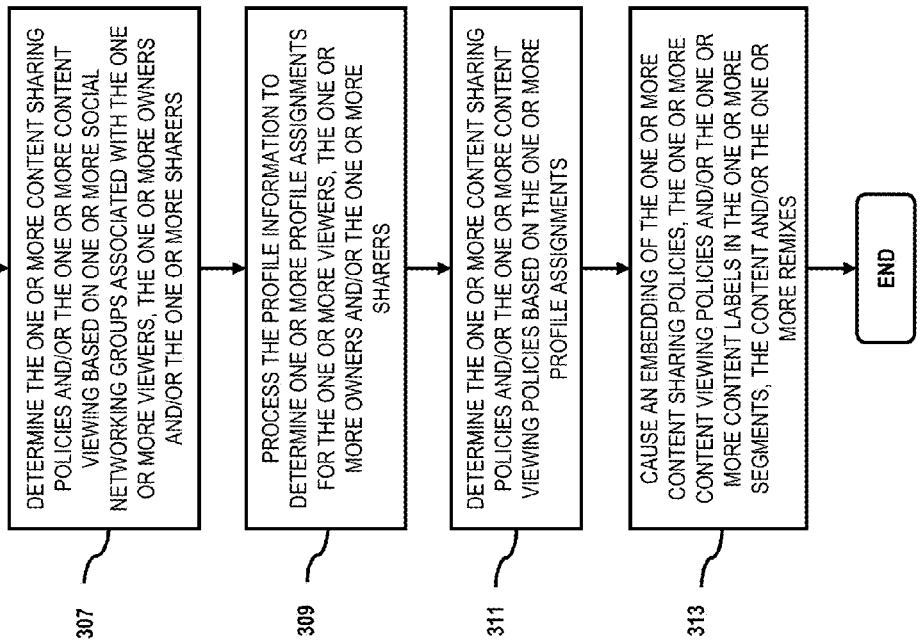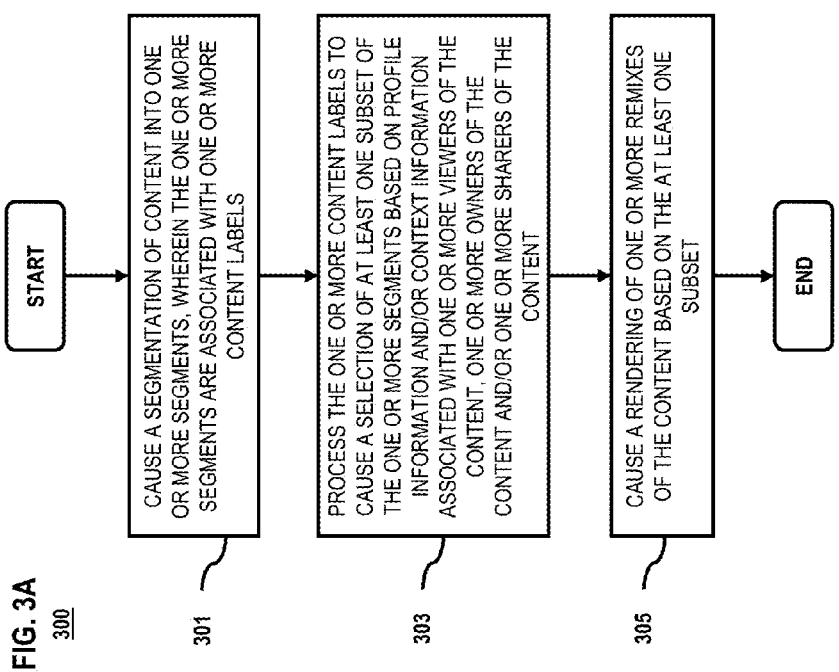

400

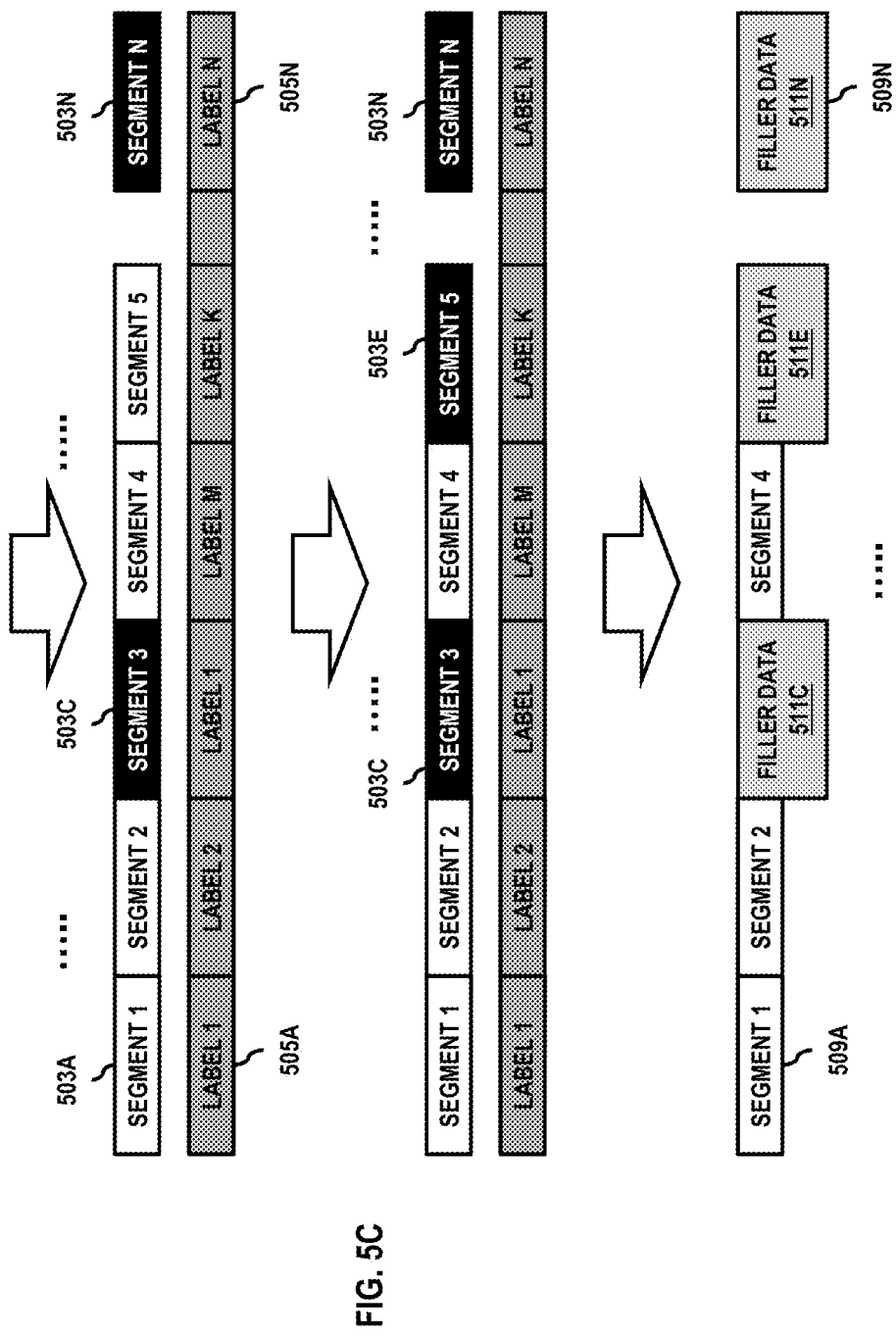

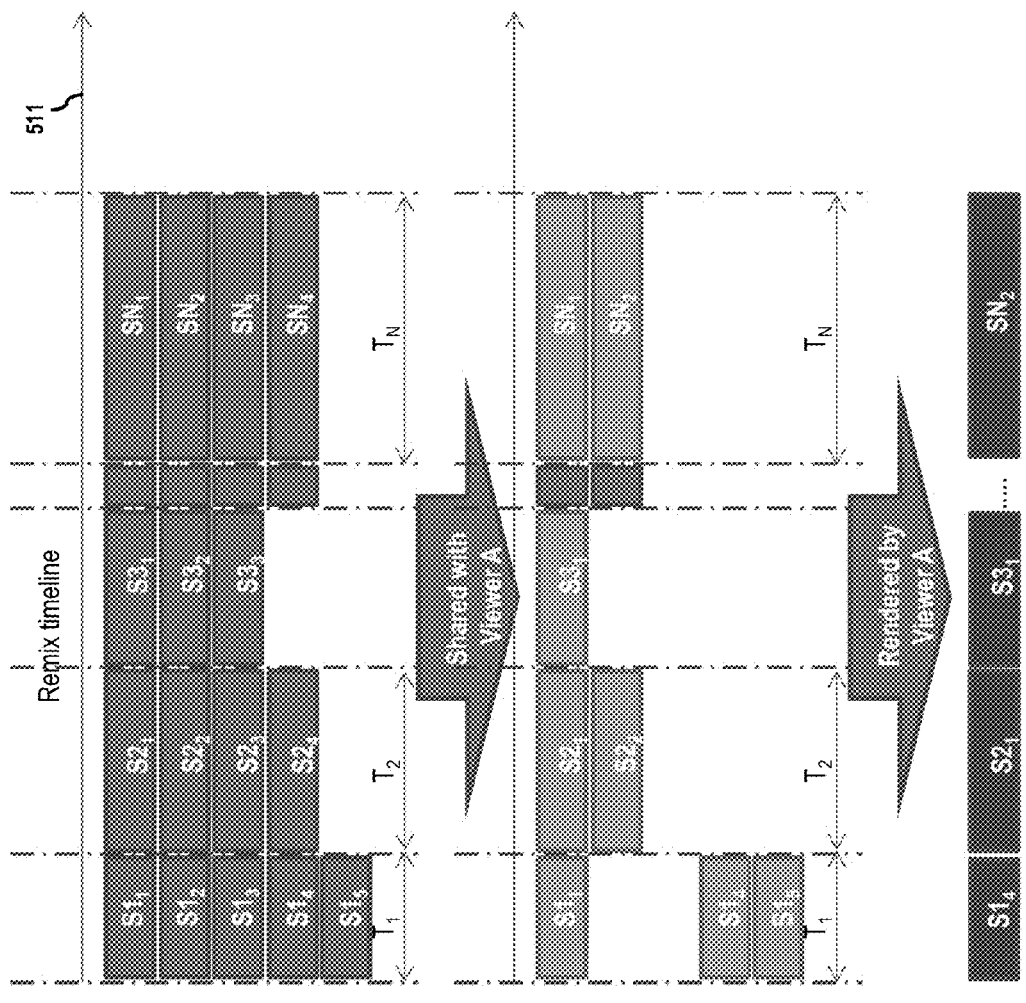

600

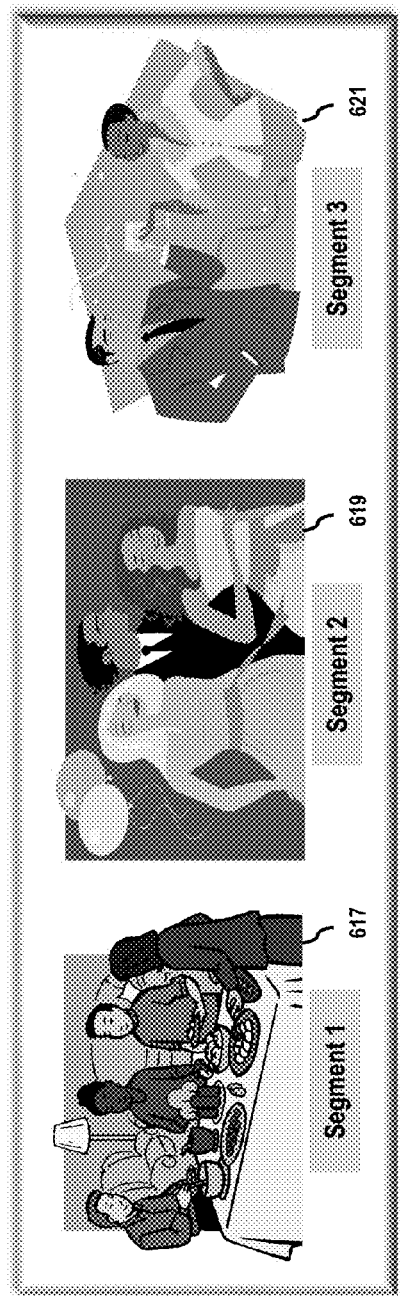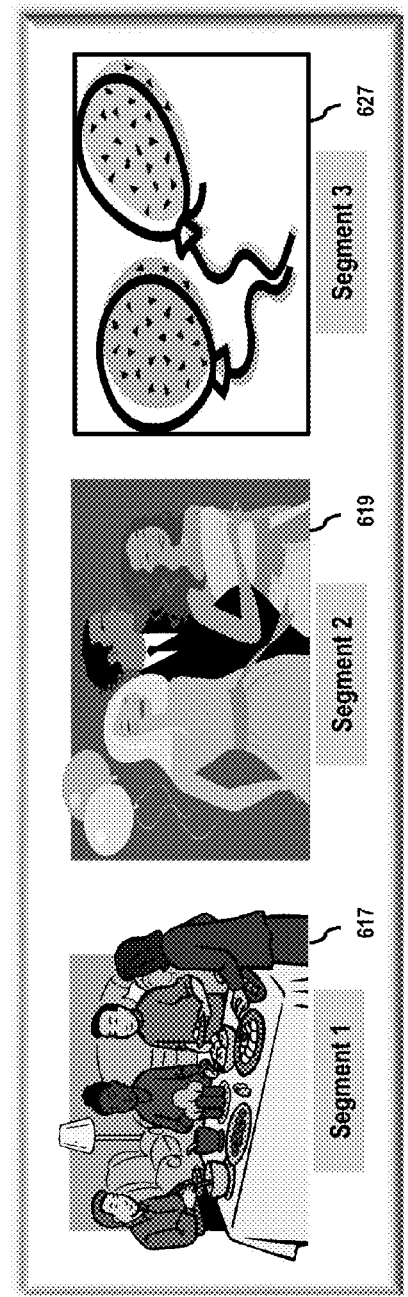

METHOD AND APPARATUS FOR PROVIDING CONTEXT-BASED OBFUSCATION OF MEDIA

BACKGROUND

The use of mobile devices integrated with cameras and other data capture tools have contributed to the rapid growth of user generated content. User generated content includes text content such as blogs, video, audio and image data. Today's mobile devices allow users to easily capture, edit and even share content with others. For example, a user of a Smartphone with an embedded camera can record content at an event they are attending and subsequently post the content to a social networking site in order to be accessed by friends and family members. As a matter of privacy or preference, the user may create several different versions, or remixes, of the original content to accommodate different types of users who may access it. Unfortunately, the task of reviewing, manipulating and compiling the captured content to generate different remixes is a tedious task for the person sharing the content. Furthermore, the person wishing to view/listen to the shared content has limited control over their ability to receive only those remixes compatible with their unique preferences and/or their current surroundings.

SOME EXAMPLE EMBODIMENTS

Therefore, there is a need for an approach for sharing and/or viewing one or more remixes of content based on the preferences of a user.

According to one embodiment, a method comprises causing, at least in part, a segmentation of content into one or more segments, wherein the one or more segments are associated with one or more content labels. The method also comprises processing and/or facilitating a processing of the one or more content labels to cause, at least in part, a selection of at least one subset of the one or more segments based, at least in part, on profile information, context information, or a combination thereof associated with one or more viewers of the content, one or more owners of the content, one or more sharers of the content, or a combination thereof. The method further comprises causing, at least in part, a rendering of one or more remixes of the content based, at least in part, on the at least one subset.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a segmentation of content into one or more segments, wherein the one or more segments are associated with one or more content labels. The apparatus is also caused to process and/or facilitate a processing of the one or more content labels to cause, at least in part, a selection of at least one subset of the one or more segments based, at least in part, on profile information, context information, or a combination thereof associated with one or more viewers of the content, one or more owners of the content, one or more sharers of the content, or a combination thereof. The apparatus is further caused to cause, at least in part, a rendering of one or more remixes of the content based, at least in part, on the at least one subset.

According to another embodiment, a computer-readable storage medium carries one or more sequences of one or more instructions which, when executed by one or more processors, cause, at least in part, an apparatus to cause, at least in part, a segmentation of content into one or more segments, wherein the one or more segments are associated with one or more content labels. The apparatus is also caused to process and/or facilitate a processing of the one or more content labels to cause, at least in part, a selection of at least one subset of the one or more segments based, at least in part, on profile information, context information, or a combination thereof associated with one or more viewers of the content, one or more owners of the content, one or more sharers of the content, or a combination thereof. The apparatus is further caused to cause, at least in part, a rendering of one or more remixes of the content based, at least in part, on the at least one subset.

According to another embodiment, an apparatus comprises means for causing, at least in part, a segmentation of content into one or more segments, wherein the one or more segments are associated with one or more content labels. The apparatus also comprises means for processing and/or facilitating a processing of the one or more content labels to cause, at least in part, a selection of at least one subset of the one or more segments based, at least in part, on profile information, context information, or a combination thereof associated with one or more viewers of the content, one or more owners of the content, one or more sharers of the content, or a combination thereof. The apparatus further comprises means for causing, at least in part, a rendering of one or more remixes of the content based, at least in part, on the at least one subset.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are flowcharts of processes for sharing and/or viewing one or more remixes of content based on the preferences of a user, according to various embodiments;

FIGS. 4 and 6A-6C are diagrams of user interfaces utilized in the processes of FIGS. 3A-3C, according to various embodiments;

FIG. 5A-5C are diagrams of content being associated with labels for sharing and/or viewing by a user, according to various embodiments;

FIGS. 5D-5F are diagrams of content being segmented for sharing and/or viewing by a user, according to one embodiment;

DESCRIPTION OF SOME EMBODIMENTS

Examples of a method, apparatus, and computer program for sharing and/or viewing one or more remixes of content based on the preferences of a user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to video, audio and multimedia content, it is contemplated that the approach described herein may be used with other forms of content capable of being executed by a device. The exemplary embodiments may be utilized for the processing of any content capable of being rendered to and/or shared with a user interface, device component interface (e.g., speaker system), or the like for visual and/or auditory execution.

Figure 1:
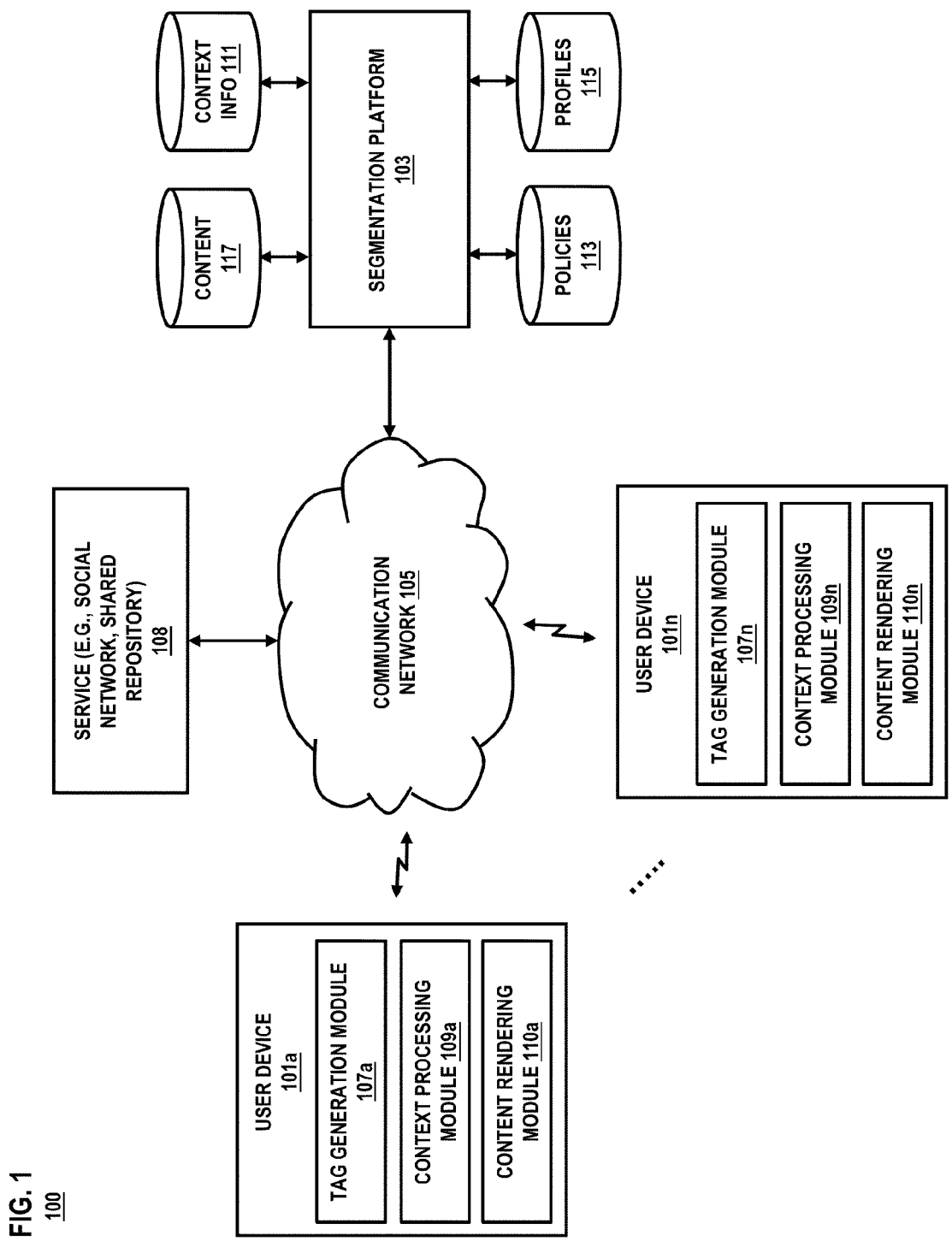
FIG. 1 is a diagram of a system capable of sharing and/or viewing one or more remixes of content based on the preferences of a user, according to one embodiment.

FIG. 1 is a diagram of a system capable of sharing and/or viewing one or more remixes of content based on the preferences of a user, according to one embodiment. The system 100 includes a segmentation platform 103 that is configured to enable content generated by a owner (of said content) to be segmented—i.e., broken into one or more portions of the overall content—for association with one or more labels. The one or more labels are descriptors that identify the nature, context, details or features of the specific segment of the content. Based on this segmentation and labeling process, the segments are then assigned to one or more viewers (of said content) based on their affiliation with the owner or sharer of the content. In addition, access to the particular content, or a subset comprising various segments thereof, may also be predicated upon the specific preferences and/or requirements of the owner and/or sharer, the preference and requirements of the viewer, or a combination thereof.

Today's mobile devices allow users to easily capture, edit and even share content with others via a communication network. Consequently, it is commonplace for user's to capture content and post it to a social networking site, shared data repository or other service for enabling easy access to content by friends, family and associates. However, the user must take care to ensure the content as posted is appropriate for the particular viewing audience. For example, video footage featuring a gathering of adults at a party enjoying alcoholic beverages may not be deemed by the user (owner of the content) as appropriate for viewing by their young nieces and nephews who frequent their online profile page via the social networking site. As another example, segments of the content featuring one or more people using colorful language may be deemed too risqué for viewing by the user's co-workers. Consequently, most users who develop content generate one or more remixes, or versions, of the content to accommodate the different viewers. Typically, the remix is an edited version of the original content featuring differing segments and/or sequences of the content; the remix being tailored to account for the specific relational context of the viewer(s) and the owner.

Unfortunately, the task of reviewing, manipulating and compiling content to generate one or more remixes is a tedious task. While the user may have software tools available for performing content editing and remixing, the user is still required to manually remove the unwanted segments of content. Furthermore, the person wishing to view/listen to the shared content has limited control over their ability to receive content, or versions thereof, that is suitable to their unique preferences and/or their current surroundings.

To address this problem, a system 100 of FIG. 1 introduces the capability to associate specific remixes of content, as provided by a sharer or owner of the content, with one or more viewers based one or more content viewing and/or content sharing policies. The policies for content viewing and/or sharing are regulated by a segmentation platform 103, a network 105 accessible solution and/or service for use in connection with one or more user devices 101a-101n of an owner, sharer or viewer of content. The segmentation platform 103 executes one or more policies in response to a request for access to the content by a particular viewer in connection with their profile information. In addition, the segmentation platform 103 enables content to be automatically remixed at the discretion of the owner/sharer responsive to a request to share content—i.e., a request to post content at a site of a social networking service 108. Under this scenario, segments comprising a specific remix are associated with one or more labels for describing, defining or categorizing the content. Thus, the segmentation platform 103 supports both content sharing and content viewing based on the assignment of policies and/or labels to specific segments of the content as shown in TABLE 1 below:

TABLE 1

Assignment of policies and/or labels for enabling content sharing

Use intelligence embedded in a media stream, i.e., labels for various content segments and/or specific content sharing policies corresponding to said labels. For this implementation, the user need only define the policy with respect to the labels for the media segments without having to manually filter and separate content to accommodate different viewers (profiles).
Assignment of polices and/or labels for enabling content viewing Use intelligence embedded in a media player or renderer, i.e., specific content viewing policies and/or context sensing (i.e., sensing the surroundings as well as user context) simultaneously to direct how content is rendered. The viewer may assign additional viewing policies to suit their unique viewing requirements.

The following paragraphs outline the various approaches presented in the table. Of note, the "intelligence" pertains to the ability of the system 100 to enable sharing of data without requiring manual intervention on the part of the owner or sharer of content or the viewer of content. For the purpose of illustration, the owner of content pertains to a user of a device, e.g., any one of user devices 101a ... 101n (also referred to as a user device 101), who is responsible for capturing an original version of the content while a sharer is a user of a device that uploads, stores, posts or otherwise shares content with one or more other users. The sharer may convey the content with other device users by way of a service 108, such as a social networking site, photo or video sharing site, or the like. Also, for example purposes, the viewer pertains to any device user capable of accessing the content as shared. It is noted that the owner and sharer are deemed to be synonymous for discussion purposes.

The segmentation platform 103 enables content to be shared by the owner/sharer based on a determined affinity and/or association between the content, one or more segments of said content, or a combination thereof with a target viewer. More specifically, the segmentation platform 103 determines which portions, or segments of content, are to be shared with one viewer versus another. In certain embodiments, the segments of content 117 are stored by the segmentation platform 103 temporarily, in association with one or more labels, for transference to a repository of a social networking service 108 or other service. Alternatively, the content 117 generated by an owner or shared by a sharer is maintained by the segmentation platform 103 for on demand execution in response to an access request by different viewers. Content to be shared with a particular viewer is based on one or more content viewing policies, one or more content sharing policies, or a combination thereof.

Content may include, for example, video, audio, multimedia data or a combination thereof. The segmentation platform 103 is configured to process content as captured and/or shared by a user device 101 into various segments. For example, content that is originally of a size of X bytes may be divided into various segments of smaller size N, where each segment N represents a subset of the content. Under this scenario, a video file that is 4 megabytes in size can be broken into 4 distinct segments of 1 megabyte each. Alternatively, the 4 megabyte file can be broken into multiple segments of varying size (e.g., 2 segments of size 3 megabytes and 1 megabyte respectively). The number of segments into which the original content can be divided is based, at least in part, on one or more of the following: (a) a period of time/interval for which the content is deemed to correspond to a preference, condition and/or criteria as set by the viewer and/or sharer of the content in question; (b) a period of time/interval for which the content is deemed to violate a preference, condition and/or criteria as set by the viewer and/or sharer of the content in question. In either case, the number of instances of unwanted content may affect the extent of segmentation of the content.

In certain embodiments, the segmentation platform 103 maintains the policies in a database 113, where each policy 113 is linked to a specific user profile 115 or a group profile to which a user may belong. For example, a viewer's profile information may include a reference to the specific set of policies they require for customizing how content is rendered (i.e., conveyed and/or shared) to their user device 101 upon request. An owner or sharer's profile information may also include a reference to the specific set of policies they require for affecting how content is shared with others. Policies 113 (specifically the content sharing policies) are executed by the segmentation platform 103 based on the processing of one or more labels assigned to various segments of the content. In certain embodiments, the content viewing policy defines one or more preferences of a user/viewer for receiving/accessing content. This may include one or more instructions, conditions or criteria for defining the types of content to be presented relative to the context of the viewer at the time of viewing. Likewise, the content sharing policies define one or more preferences of a user/owner/sharer for conveying content. Content sharing policies may include one or more instructions, conditions or criteria for defining the types of content to be shared with viewers via a service 108 (e.g., social network).

In certain embodiments, the content viewing policies are controlled by the client/requesting device 101 and not the segmentation platform 103. For example, the segmentation platform 103 is only configured to provide labels for designated segments of the content as well as enable the users to access the segmented content in accordance with an established content sharing policy. The content viewing policies may nonetheless be shared with the segmentation platform 103 accordingly via the profile. Under this scenario, a content sharing and/or viewing policy may include a restricting of access to content containing profanity or violence (e.g., a gun). The user may also specify a particular type or category of content to be shared and/or viewed—i.e., music, sports, etc. As such, only content determined to be of this type can be shared by the owner/sharer or viewed by the viewer. Also, the policy 113 may define a particular device type in which the content is to be rendered for viewing. For example, one remix of the content may be optimized for rendering/sharing via a television while another remix is intended for execution via a laptop. The policy may also include one or more conditions, such as a setting for defining a time interval for generation of a remix of the content.

In yet another example, a condition may include a specification of particular content to be rendered/shared in response to a given context of the viewer. For example, when the viewer is at work, a particular remix of the content is presented whereas another remix is presented when the user is determined to be at home. Hence, conditional viewing constraints may selected for assignment to specific content such as "Not to be watched with children present", "Not appropriate in certain locations," etc. As will be discussed more fully with respect to FIG. 4, the segmentation platform 103 provides a configuration interface for enabling the customization and selection of various policy options and constraints.

The various policies are associated with profile information 115 related to a particular owner, sharer or viewer. In certain embodiments, the segmentation platform 103 maintains profile information 115 regarding the various users of devices 101a-101n. Profile information 115 may be pulled (retrieved) from a contact list available to a user device 101, a social networking site available to a user, or a combination thereof. The profile information may include, for example, a contact number, email address, messaging handle, or other point of contact information for a given user to which content is to be made available. In addition, the profile information may specify a type of relationship, or profile type, between an owner/sharer of content and a viewer of said content. For example, profile type (also referred to as a profile assignment) may be specified in accordance with a user profile at a social networking service 108 to define a contact as a friend, family, extended family, co-worker, acquaintance, teammate, etc. Multiple users may be further associated with a group profile or more than one profile at a time (e.g., both friend and co-worker). In one embodiment, user may define group profile for friends, family, extended family, co-worker, acquaintance, teammate, etc., and map users to one or more of these group profiles.

As noted, one or more labels may be embedded in the content (e.g., as metadata) during generation of the content. The segmentation platform 103 is configured to permit the labelling of specific segments of content for facilitating its sharing with others. Likewise, the segmentation platform 103 processes labels associated with segments of the content in order to link the segments with specific policies of a user for facilitating content viewing. In certain embodiments, the labels provide details, descriptors, or other contextual information regarding the content at various intervals or points of execution. Hence, the labels may be broadly associated with a full, original version of content or individually associated with segments of content. Under this scenario, one or more labels relating to the complete/original video footage of a party the user attended in honour of their cousin may include "Party," "Music," "Cousin Bob," etc. Alternatively, the specific segment of the content depicting a dance competition between partygoers may be labelled "Dance Off," "Rock-n-Roll," "Dance floor," etc.

In addition, the labels are associated with different profile types to define the type of access or the group of users that a particular segment corresponds to based on profile type. For example, a label may be associated with the profile type "Family" or "Acquaintance" for indicating that a particular segment of content bearing such a label is related to a viewer who is a friend or acquaintance of the owner/sharer of the content. In certain embodiments, the segmentation platform 103 associates a label with default profile types. Also, some labels may be assigned to only one profile type while some may be assigned multiple profile-types. For example, a label for describing content depicting a child of the sharer generated as "My child" may be assigned the profile type of Family while a label for describing content depicting the sharer's dog generated as "My Dog" may be assigned to multiple profile types including Family, Friends and Extended Family. It is noted that the segmentation platform 103 enables the assigning of super-profiles—i.e., a profile type that encompasses all of the different profile types. For example, a profile type "Public" provides access to users falling under all the other profiles (ex. Friends, Office, Family, etc) even if the profile access was granted only to the Public profile.

In certain embodiments, the segmentation platform 103 is configured to generate labels to be associated with the content. Alternatively, the various user devices 101a-101n may be equipped with a tag generation module 107a-107n for enabling the generation of labels, such as in response to the capturing of content at a user device 101. Operating in connection with the tag generation module 107 is a context processing module 109, which is configured to capture various context information related to the user of the device or the device 101 itself. The context processing module 109 processes information coming from various sensors of the device for acquiring and inferring context information, including (but not limited to) global positioning sensors, network detection sensors, gyroscopes, motion detectors, time sensors, and other data acquisition devices. By way of these sensors, the context processing module 109 detects location information (e.g., longitude and latitude, geospatial coordinates, building coordinate data), device and/or user position and/or orientation information, time zone, time and date information, network connectivity information (e.g., IP Address, network connection status, location area identity), user and/or device profile information (e.g., service-subscriber key, user identifier, serial number), or a combination thereof. In addition, the context processing module 109 may acquire sound, light and image data via the one or more integrated cameras, sound recorders, etc., of the device. In certain embodiments, the context information as collected is conveyed to the platform 103 for determining the current environment and/or context of the user and/or device 101. The context information may be also associated with content during the time of capture for generating contextually relevant labels (e.g., generate a label for specifying a restaurant by name rather than by broad categorical reference). Various known context processing, ontology processing, tag generation and other data processing schemes may be employed for generating the labels accordingly.

In certain embodiments, the segmentation platform 103 also processes context information related to the user to affect how content is rendered. For example, a policy for a particular viewer may be set to prevent the playback, presentment, sharing or other types of rendering of any movie featuring alcohol, smoking or sexual behaviour when the viewer is in the presence of children. Under this scenario, when a request for access to the movie content is initiated by the viewer, a contextual or environment analysis procedure is performed. Hence, in addition to determining those segments of content featuring labels associated with the profile type (or profile assignment) of the requesting viewer and that meet the policies of the viewer, the context processing module 109 also forwards context information regarding the current status and/or surroundings of the device 101. The context information may include, for example, location information for detecting whether the user is at the home of their young nephew. Other context information may include sound data as collected by an audio recorder of a user device 101 for capturing data featuring the sound of children. Upon processing this context information, the segmentation platform 103 is able to determine that only certain segments of the movie content be shown at the present moment. It is noted that various other forms of context data can be acquired by the context processing module 109 and subsequently processed by the segmentation platform 103.

In certain embodiments, the segmentation platform 103 enables execution of a content rendering interface for supporting the viewing of content at a given device based on policy settings and/or a determined context of the user. By way of example, the content rendering interface may be implemented as a standalone module, i.e., content rendering module 110, capable of operation at a user device 101. As another example, the content rendering interface may be provided by the segmentation platform 103 as a widget or other executable for use in connection with a browser or web portal application. The specific implementation may vary depending on user and/or device requirements. Regardless of the approach, however, the content rendering interface serves as a interface for enabling the user to interact with content on the basis of their predetermined preferences (e.g., no violent content) or current environmental/contextual circumstances (e.g., children are present at the time of viewing).

As shown in FIG. 1, the system 100 comprises user devices 101a-101n having connectivity to the segmentation platform 103 and service 108 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the segmentation platform 103 and service 108 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
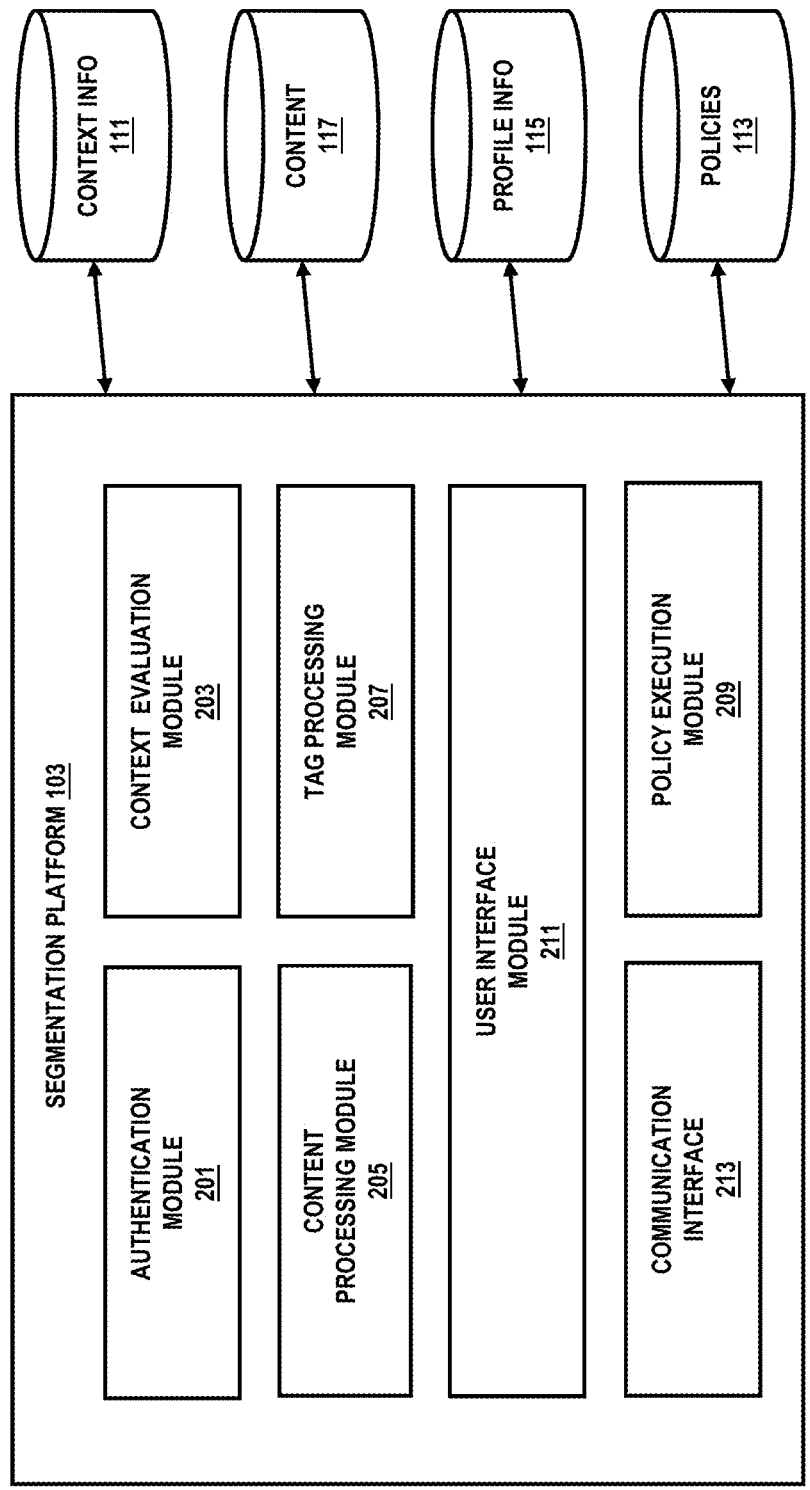
FIG. 2 is a diagram of the components of a segmentation platform, according to one embodiment.

FIG. 2 is a diagram of the components of a segmentation platform, according to one embodiment. By way of example, the segmentation platform 103 includes one or more components for providing sharing and/or viewing one or more remixes of content based on the preferences of a user. It is contemplated that the functions of these components may be combined in one or more components or performed by other components of equivalent functionality. In this embodiment, the segmentation platform 103 includes an authentication module 201, a context evaluation module 203, a content processing module 205, a tag processing module 207, a policy execution module 209, a user interface module 211 and a communication interface 213.

In addition, the segmentation platform 103 maintains content 117 as captured or shared by one or more user devices 101a-101n as well as context information 111 associated with the content. Policy information 113 and profile information 115 is also maintained for association with one or more owners, sharers or viewers of content. It is noted that the modules 201-213 may access this data for performing various functions.

In one embodiment, an authentication module 201 authenticates users and user devices 101a-101n for interaction with the segmentation platform 103. By way of example, the authentication module 201 receives a request to subscribe to the segmentation platform 103, such as according to a service agreement, for enabling segmentation of provided content, selective content sharing and viewing. The subscription process may include the establishment of user preferences, including designated contacts to enable for viewing, personal information sharing policies, etc. The authentication module 201 may also operate in connection with a user interface module 211 to enable receipt of policy configuration data from a user. As such, policies for affecting how content is shared and/or rendered may be established.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the segmentation platform 103 (e.g., as enabled by user interface module 211). Registration data (e.g., profile information 115) for respective subscribers, which contains pertinent user or device profile data, may be cross referenced as part of the login process. Alternatively, the login process may be performed through automated association of profile settings maintained as profile information 115 with an IP address, a carrier detection signal of a user device, mobile directory number (MDN), subscriber identity module (SIM) (e.g., of a SIM card), radio frequency identifier (RFID) tag or other identifier.

The authentication module 201 is also configured to receive and interpret requests from users of devices for execution of content sharing and/or content viewing. By way of example, a request to share content with one or more contacts via a social networking site may be received, such as via the content rendering module 110 of a respective device. Based on this request, the authentication module may 201 triggers activation of the other modules. As another example, the authentication module 201 may receive and interpret a request to view content and trigger the other modules accordingly. In certain embodiments, the authentication module 201 may be integrated with a social networking site or other service 108 for detecting the requests of one or more subscribed/registered owners, sharers or viewers of content.

In one embodiment, the context evaluation module 203 determines a particular policy to execute relative to a request for viewing or sharing of content. By way of example, the context information received from the context processing module 109 of a device requesting to view content is evaluated against the content viewing policies 113 of the user. When it is determined that the context information corresponds to a particular policy condition, the evaluation module 203 alerts the policy execution module 209, which in turn causes rendering and/or sharing of only select segments of content corresponding to the policy. It is noted that the context evaluation module 203 may also operate in an equivalent manner to the context processing module 109 of a given device for processing contextual criteria. The criteria may include one or more temporal criteria, criteria regarding one or more viewers or devices, etc.

In one embodiment, a content processing module 205 is configured to process content based on instructions conveyed by the policy execution module 209 (e.g., a module configured to trigger execution of one or more policies corresponding to a particular profile of a owner, sharer and/or viewer). This may include, for example, generating one or more segments of content according to specific policy constraints, temporal criteria, etc. The content evaluation module 203 may also be configured to evaluate one or more images, sounds, video or other data comprising the content against known pattern detection, heuristic analysis, inference or deductive processing, object matching, ontological schemes, and other analysis models. This execution is performed in connection with one or more models (not shown) which may include for example data, framework, schemas, mappings, characteristic sets, tables and other information for enabling the content to be recognized. When a segment of content matching a particular policy restriction and/or criteria is identified, this particular segment is flagged for inclusion/exclusion according to the policy, profile information associated with the viewer and/or owner/sharer of the information, or a combination thereof. As such, the combinations of content segments comprise a particular remix. Of note, the order of the media segments and also the duration of each media segment used to generate the remix is based on one or more of: the nature of the content being shared (e.g., sports related, music); a particular content execution preference of a user (e.g., fast motion remix, slow motion remix, animations); and/or the type of content expected to be rendered (e.g., a documentary, trailer with music, trailer without music, etc). While generating a remix, multiple media segments are chosen for a single temporal segment. This enables generating a remix that satisfies multiple priorities.

The content processing module 205 is also configured to operate in connection with a tag processing module 207 for associating one or more labels embedded in the content with a particular profile type (or profile assignment) of one or more viewers, owners or sharers. In certain embodiments, the content processing module 205 parses the content to detect any applied labels, while the tag processing module 207 matches the profile type of the label with a profile type indicated in the profile information database 115. The match enables the specific segments of content to be gathered and compiled for generation of a remix. The content processing module 205 also receives feedback from the context evaluation module 203 in order to further restrict those segments of content that violate current contextual and/or environmental conditions of the viewer.

In one embodiment, the tag processing module 207 is also configured to generate labels for being associated with one or more segments of content in response to a request for sharing of content. Labels are generated to provide a description of the content, a segment of content, or a combination thereof. By way of example, a video featuring an erupting volcano may feature various tags including, "Ash," "Lava," "Volcano." In addition, the labels specify one or more policy types, i.e., Friend, Family, Co-worker. Context information may be used during the time of content capture for generating contextually relevant labels. It is noted, in certain instances, that context information may also be based on historical information for informing the generation of tags. For example, in the case of an erupting volcano, additional tags may indicate the location of the occurrence, a name associated with the event, external or third-party news feed data related to the image, etc.

In one embodiment, a communication interface 213 enables formation of a session over a network 105 between the segmentation platform 103 and the various modules 107 109 and 110 at the user device. By way of example, the communication interface 213 executes various protocols and data sharing techniques for enabling collaborative exchange between a subscribed owner, sharer or viewer's user device 101a-101n (e.g., mobile devices, laptops, smartphones, tablet computers, desktop computers) and the platform 103. Of note, the communication interface 213 also support the conveyance of content in the form of one or more remixes relative to a given set of policies associated with a specific user profile.

In one embodiment the user interface module 211 enables presentment of a graphical user interface for rendering content. In addition, the user interface module 211 may enable the presentment of a user interface for facilitating the configuration of the one or more policies or user preferences. By way of example, the user interface module 211 generates the interface in response to application programming interfaces (APIs) or other function calls corresponding to the browser application or web portal application of the user devices 101a-101n; thus enabling the display of graphics primitives. In this case, the browser session may support execution of content playback in response to labeled content. As another example, the user interface module 211 may be integrated for use in connection with a social networking application, a service provider 108, or for direct operation in connection with the content rendering module 110 of a device 101.

The above presented modules and components of the platform 103 can be implemented in hardware, firmware, software, or a combination thereof. Though depicted as a separate entity in FIG. 1, it is also contemplated that the platform 103 may be implemented for direct operation by respective user devices 101a-101n. By way of example, the one or more modules 201-213 may be implemented for operation by respective user devices, and therefore, may generate direct signal inputs by way of the operating system of the user device 101.

Figure 3C:
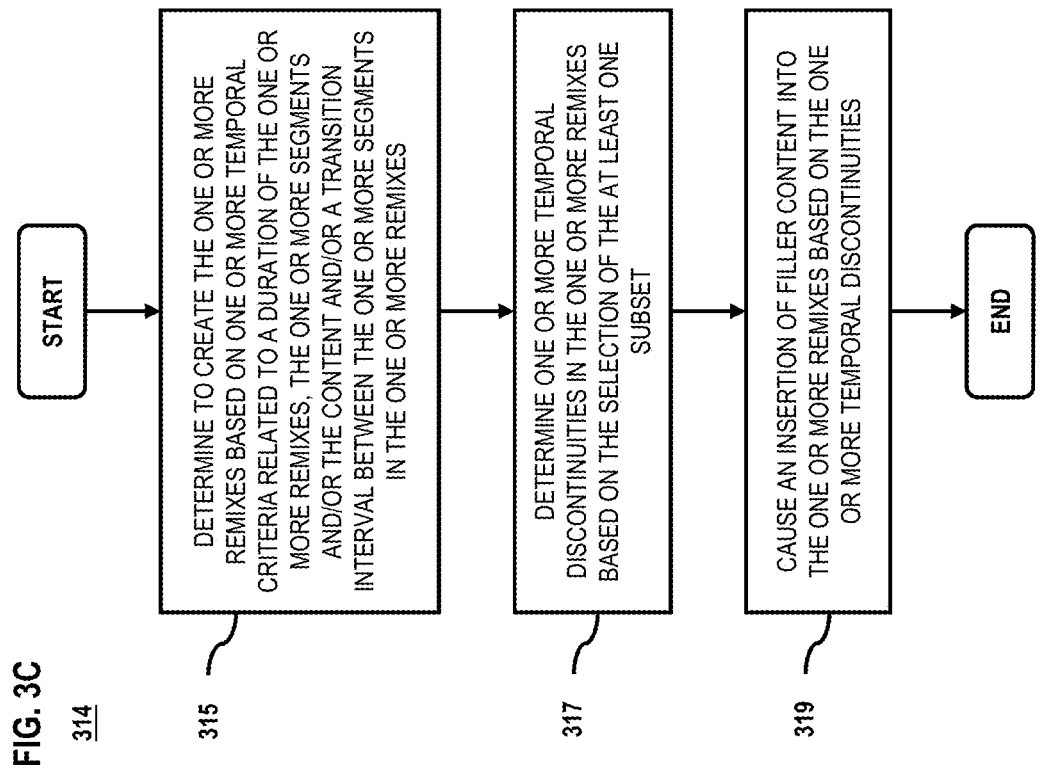
Figure 8:
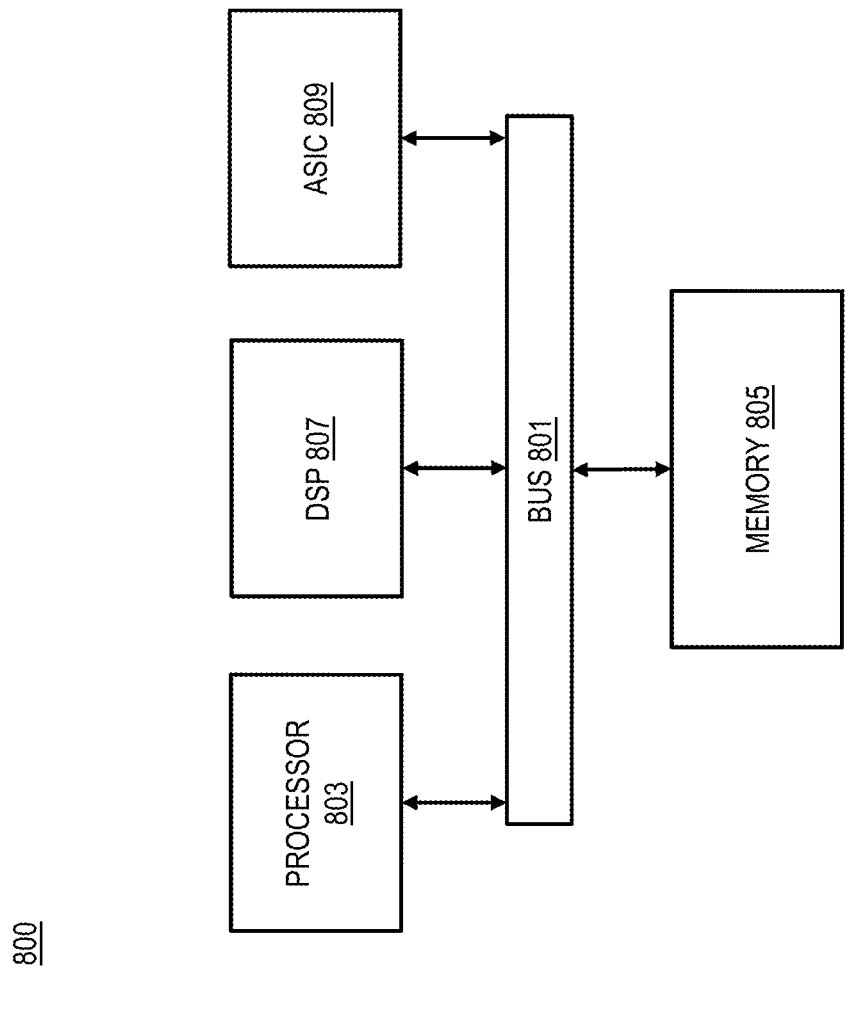
FIG. 8 is a diagram of a chip set that can be used to implement an embodiment of the invention.

FIGS. 3A-3C are flowcharts of processes for sharing and/or viewing one or more remixes of content based on the preferences of a user, according to various embodiments. In one embodiment, the segmentation platform 103 performs processes 300, 304 and 314 and is implemented in, for instance, a chip set including a processor and a memory as shown in FIG. 8. In step 301, the platform 103 causes a segmentation of content into one or more segments, wherein the one or more segments are associated with one or more content labels. The platform also processes the one or more content labels to cause, at least in part, a selection of at least one subset of the one or more segments. As noted previously, selection is based, at least in part, on profile information, context information, or a combination thereof associated with one or more viewers of the content, one or more owners of the content, one or more sharers of the content, or a combination thereof. This corresponds to step 303. Per step 305, the platform 103 causes a rendering of one or more remixes of the content based, at least in part, on the at least one subset. It is noted that the rendering may include a playback, execution or calling of the content for audible and/or visual presentment to a device 101 of a user.

In step 307 of process 304 (FIG. 3B), the platform 103 determines the one or more content sharing policies, the one or more content viewing policies, or a combination thereof based on one or more social networking groups associated with the one or more viewers, the one or more owners, the one or more sharers, or a combination thereof. As noted previously, the content sharing and/or viewing policies are used to determine which of the one or more remixes to share with the respective one or more social networking groups. Also as noted, the group may comprise one or more device users affiliated with the owner and/or sharer of the content on the basis of a defined profile type and/or assignment.

In step 309, the platform 103 processes the profile information to determine one or more profile assignments for the one or more viewers, the one or more owners, the one or more sharers, or a combination thereof. In another step 311, the platform 103 also determines the one or more content sharing policies, the one or more content viewing policies, or a combination thereof based, at least in part, on the one or more profile assignments. As noted, a policy for one member of a group may differ from that of another as each individual viewer, sharer and/or owner is able to customize their preferences and settings accordingly. In addition, the policies may specify one or more contextual criteria for determining the selection of a subset of content segments to be rendered in response to a request. The contextual criteria may include, for example, one or more location criteria, one or more temporal criteria, one or more criteria regarding presence of one or more other viewers, one or more device capability criteria, or a combination thereof.

Per step 313, the segmentation platform 103 causes an embedding of the one or more content sharing policies, the one or more content viewing policies, the one or more content labels, or a combination thereof in the one or more segments, the content, the one or more remixes, or a combination thereof. As such, the content is processed by the segmentation platform 103 or a content rendering module of a device based on the labels, policies, and contextual criteria required to render the content. For example, a content rendering module at a device may operate in connection with a social networking site (e.g., as a widget) for enabling playback of a video remix in response to a request for access to shared content. Based on the embedded policies, only those segments allowed by the user and requesting viewer are rendered. Still further, embedded labels may be processed by the content rendering module to further restrict execution of the video to only those users corresponding to the profile assignment in the label.

In step 315 of process 314 (FIG. 3C), the platform 103 determines to create the one or more remixes based, at least in part, on one or more temporal criteria related, at least in part, to (a) a duration of the one or more remixes, the one or more segments, the content, or a combination thereof; (b) a transition interval between the one or more segments in the one or more remixes; or (c) a combination thereof. In another step, the platform 103 determines one or more temporal discontinuities in the one or more remixes based, at least in part, on the selection of the at least one subset. In certain embodiments, temporal discontinuities may represent segments of content to be filled. For example, the user may specify filler content to be placed into the content stream in place of areas where content was intentionally restricted per one or more policy settings or contextual criteria conditions being met. Hence, per step 319, the platform 103 causes an insertion of filler content into the one or more remixes based, at least in part, on the one or more temporal discontinuities. In certain embodiments, the filler content may include interpolated content, advertisement content, user selected content (e.g., white space, ambient noise), etc.

Figure 4:
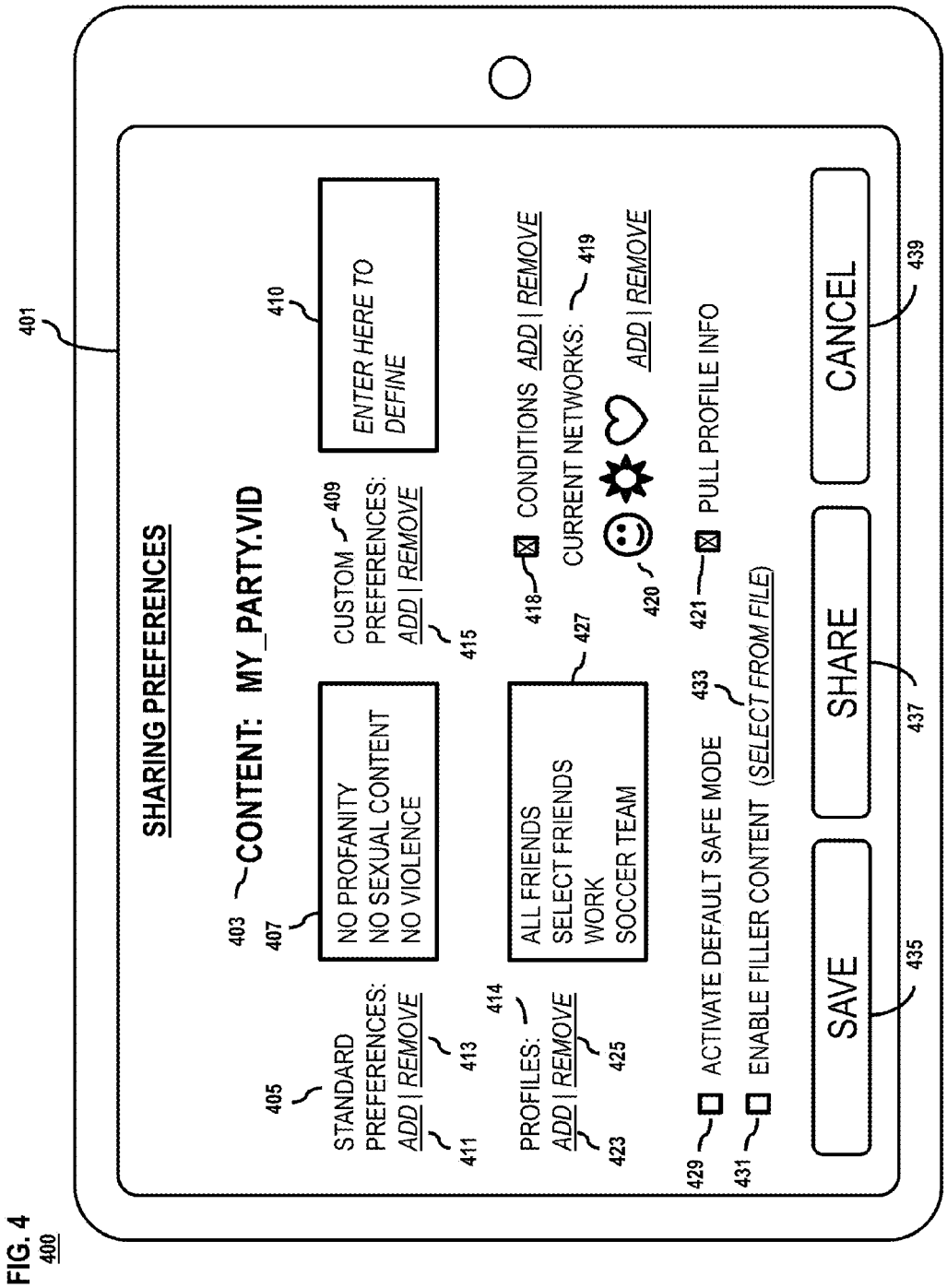

FIG. 4 is a diagram of user interfaces utilized in the processes of FIGS. 3A-3C, according to one embodiment. Additional interfaces are also presented with respect to FIGS. 6A-6C. In FIG. 4, a sharing preferences configuration interface 401 is presented. For the purpose of illustration, the interface 401 of the device corresponds to the content sharing capabilities of the segmentation platform 103. It is noted, however, that an interface for configuring one or more content viewing policies may feature similar buttons, links and other user selection options.

A user is presented, by way of the interface 401, with various standard preferences 405, custom preferences 409 and profile types 414 to select from for affecting the accessing/sharing of video content 403 entitled "My_Party.vid." The standard preferences 405 present various selection options 407, including an option to restrict content featuring profanity, sexual content or violence. The user may add or remove selection options 407 by way of an ADD link 411 and REMOVE link 413. Per the custom preferences 409, the user may specify one or more keywords for defining their content restriction options. In addition, the user may specify one or more conditions 418 to be associated with said preferences, including a temporal condition or contextual condition. For example, the custom preference 409 may be added via an ADD link 415 to indicate a specific song or lyric that is unfavorable to the user, i.e., a song that may be deemed inappropriate to the intended audience based on the user's judgment. A condition 418 may be associated with this preference such as to indicate a specific time of day when accessing of the content featuring this song is acceptable. The user may also select one or more profile types 427 to share the content, or remixes thereof, with via the profile section 414.

Profile types may be added or removed via the corresponding ADD and REMOVE links 423 and 425 respectively.

A current networks selection 419 enables the user to specify the one or more social networks from which to pull profile information 421 and/or to post the content for access by the one or more viewers corresponding to the selected profile types 427. Activation of the pull profile information 421, for example, enables the segmentation platform 103 to retrieve the data it requires to determine a match between a specific user profile and a label as applied to a segment of content made eligible for access to viewers. The corresponding networks selected by the user are presented as one or more icons 420. The user may also add or remove networks as well as specify a contact management resource as a source of profile information.

As an alternative to defining specific preferences, the user may also activate checkbox 429 to activate a default safe mode. The default safe mode enables the user to conditionally or unilaterally specify that the content 403 only be presented in accordance with one or more predetermined "safe" conditions, which may include for example, no profanity, sexual content, violence, religious references, etc. The user may customize a safe mode, or this may be provided as a default feature of the segmentation platform 103.

Still further, the user may enable the segmentation platform 103 to enable the placement of filler content into the content stream where required by activating checkbox 431. In certain embodiments, the user may select a specific file or object to insert as filler content by the segmentation module, such as by activating a SELECT FROM FILE link 433. In addition, the user may save the established user settings and/or content sharing policy, initiate sharing and/or posting of the video, or cancel any input by way of a SAVE, SHARE and CANCEL action button 435-439 respectively.

Figure 5A:
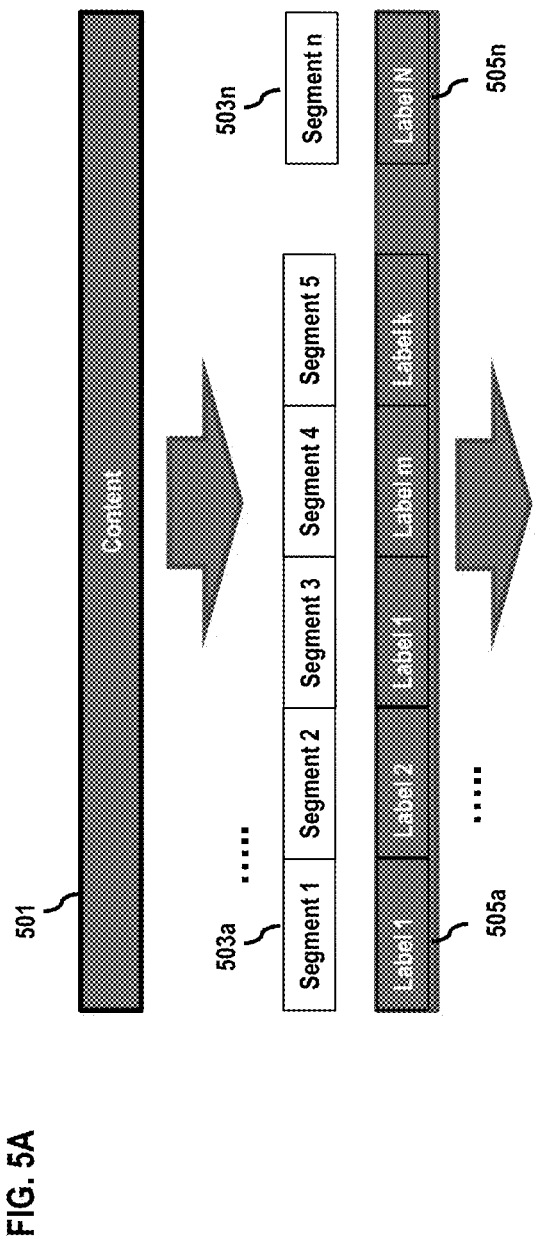

FIG. 5A-5C are diagrams of content being associated with labels for sharing and/or viewing by a user, according to various embodiments. By way of example, FIGS. 5A-5C present content 501 to be shared and/or viewed, wherein the content corresponds to a video, group of images or remix thereof. By way of example, the content 501 is to be shared (e.g., posted to a social networking site) by a sharer entitled User A. The content, or an appropriate remix thereof, is to be subsequently rendered to a device for viewing by a viewer entitled User B.

In response to a request for sharing of the content 501, the segmentation platform 103 analyzes the content to determine the nature of the content (e.g., is it sports related, politics, etc.). In addition, context information associated with content 501 is analyzed, including location information, time stamp information, etc. As such, the segmentation platform 103 enables time-stamped context data recording and storage to be performed simultaneously with recording of the content or segments thereof. This enables media analysis and label generation that is more comprehensive than techniques than rely solely on content analysis. In certain embodiments, this enables labeling of content on the basis of temporal or spatial conditions.

Resultantly, the content 501 is processed into one or more segments 503a-503n. Corresponding to each segment 503a-503n are also one or more labels 505a-505n respectively. It is noted that each segment 503 includes at least one label. Furthermore, each label specifies a profile type to for which the corresponding segment is related to. For example, segment 503a may have an embedded label 505a for specifying the content segment relates to a profile type of "Acquaintance." This profile type defines the contextual relationship between User A and User B, wherein an acquaintance relationship may indicate limited access to the full content 501 by User B.

In FIG. 5B, the one or more segments 501a-501n are further processed by the segmentation platform 103 to determine corresponding profile assignments based, at least in part, on the labels. By way of example, the profile assignment for sharing by User A with User B is shown. Under this scenario, segments 503c and 503n are determined to be granted to be accessed by user B based on the profile type/labels. All the other segments are not shared with User B. This corresponds to the specific content sharing policies as established by User A relative to one or more targeted viewers within User A's social network.

In FIG. 5C, the profile assignment for viewing by User B is shown (just below) the sharing profile of User A for comparison purposes. Under this scenario, segments 503c, 503e and 503n are determined not to be granted to be viewed by user B based on the profile type/labels. All the other segments are to be rendered to the device of User B. This corresponds to the specific content viewing policies established by User B for accessing the content provided by User A via a common social network.

As a result of the content sharing policies of User A and content viewing polices of User B, the actual remix comprising one or more segments of the content are shown as rendered segments 509a-509n. Of note, only those segments deemed allowable via the content sharing and viewing policy are enabled for rendering (e.g., only segments 1, 2 and 4). Filler data (e.g., 511c, 511e, 511n) is rendered in place of restricted segments 3, 5 and n.

FIGS. 5D-5F are diagrams of content being segmented for sharing and/or viewing by a user, according to various embodiments. The figure depicts the process executed by the segmentation platform 103 for analyzing the content, i.e., media segments from users who recorded the content or from a previously generated remix. The order of the media segments, labeled $S1_1$-$SN_n$ are shown in a multi-layered fashion with respect to a remix timeline 511. Also, the figure depicts the time duration of each content segment, labeled time durations T1-TN respectively. It is noted that the time durations correspond to that utilized to generate the remix, and is based on one or more of the type of content uses as the input, a user preference, and/or a type of content expected to be rendered as output.

While generating a remix, multiple content segments are chosen for a single temporal segment. This enables generation of a remix that satisfies multiple priorities. By way of example, for temporal segment $T_1$, multiple content segments $S1_1$-$SN_5$ are chosen to be layered. The segments are selected based, as before, on the content sharing policies and preferences of the owner and/or sharer of the content.

In FIG. 5E, those segments corresponding to the policies of a viewer entitled Viewer A are shown. Per the policy preferences of this viewer, only those segments of a respective time interval desired by the user are made available. For example, for time interval T1, only those segments $S1_1$, $S1_4$ and $SN_5$ are capable of being shared. In FIG. 5F, the corresponding segments of content as rendered per Viewer A's polices are shown, which in this case correspond to only segments A14, S21, S31 and SN2 at various time intervals T1-TN of the original remix of FIG. 5D. By way of example, the segments as rendered are only those that match the viewers preferred sequence of playback/execution of the content. This may be specified, for example, via the content viewing interface 401 as depicted in FIG. 4.

In certain embodiments, the different segments may be chosen based on the determined quality of the content. For example, the segments may be chosen based on both objective as well as semantic quality, mainly semantic quality, mainly media quality, etc. Under this scenario, the multiple layers of content segments corresponding to time duration $T_1$ would be high quality content segments or segments corresponding to interesting events that transpired at the time of acquiring and/or generation of the content.

In another embodiment, the different segments may be chosen based on the spread of profile types that are required to be accommodated, thus allowing a seamless, holistic content viewing to be experience by viewers having different profile types. As such, those content segments best suited for accommodating a wide variety of different viewers are enabled. Still further, in another embodiment, the content segments are chosen such that a semantically matching content segment is available in the current temporal segment for different media segment selection in the previous temporal segment.

Figure 6A:
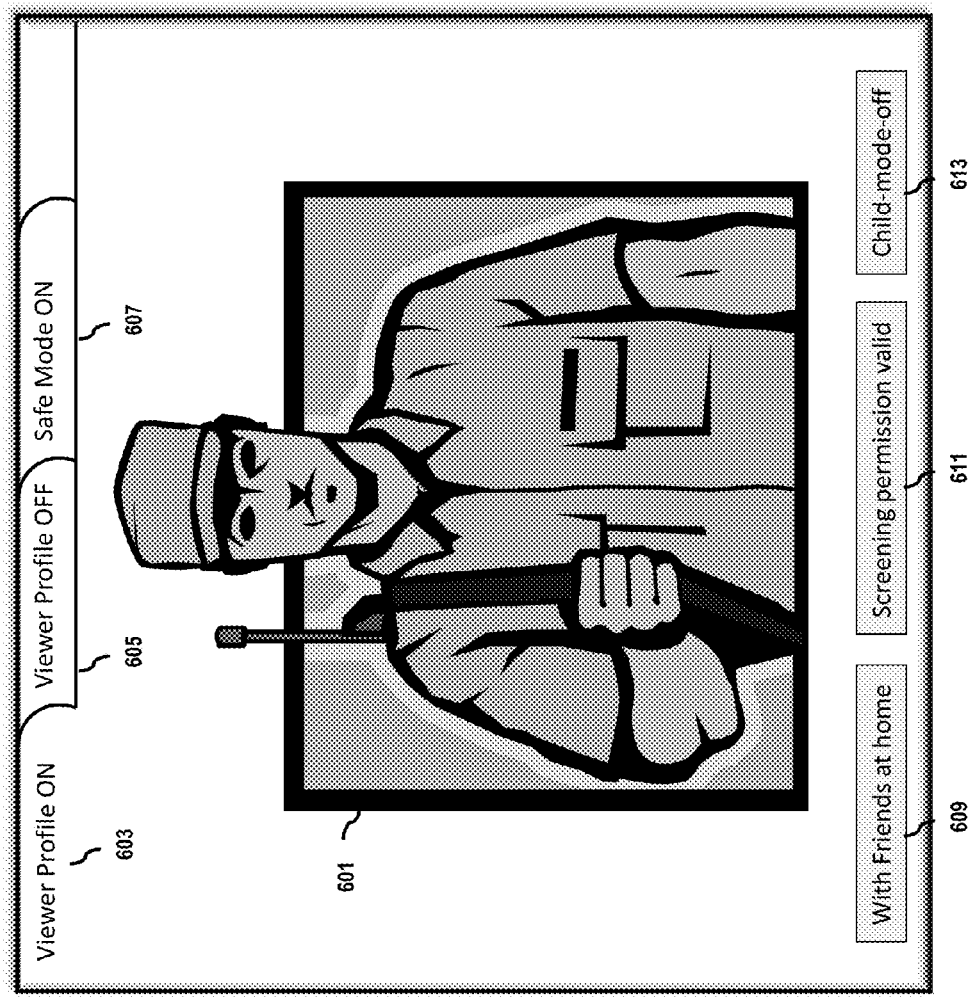

FIGS. 6A-6C are diagrams of user interfaces utilized in the processes of FIGS. 3A-3C, according to various embodiments. In FIG. 6A, a browser application 600 is presented for enabling the user to access and/or render content shared by a viewer based on their specific policies. By way of example, a movie 601 featuring a person with a gun is allowed to be presented via the browser 600 based on the following: (1) the viewer has selected the profile settings to be ON as depicted via the selection of tab 603; and (2) the current contextual status of the user is suitable for enabling presentment of such content. The current contextual status of the user is presented to the browser interface, such as to enable the viewer to be aware of their current policies and preference settings. In this example, the viewer is determined to be viewing the content "With friends at home," with "Screening permission valid" and "Child-mode off" per status information queues 609, 611 and 613 respectively. Of note, the platform 103 may detect the current contextual status based on data acquired by sensors of the active viewing device, including location information, sound data, etc. This data is processed by the platform 103 to enable automatic rendering of the content 601 according to these preferences.

Optionally, the viewer may select a Viewer profile OFF and Safe Mode ON tabs 605 and 607 respectively to activate policies suited for rending content in these modes. For example, the Safe Mode On tab 607 may correspond to a restricting of content featuring any violence, a gun, or content inappropriate for viewing by children or the general public (at the viewer's discretion, Child-mode ON, Public-mode ON), etc.

FIGS. 6B and 6C depict a rendering of content to a viewer based on the viewer policies being activated or deactivated with respect to various segments of content accordingly. By way of example, the content may correspond to multimedia content (e.g., one or more images and comments featured along with the images) related to a party attended by an owner/sharer of the content. When the viewer profile is turned OFF, all of the segments 617-621 are shown. When the viewer profile is turned ON, however, corresponding policies are applied for preventing the viewing of any content featuring alcohol, i.e., segment 621. As a result, filler content 627 is shown instead per the requirements of the owner and/or viewer.

The method and system presented herein enables a content sharer, owner and/or viewer to access and/or share content based on one or more predetermined user preferences. Various advantages presented by way of the exemplary embodiments featured herein include, for example, enabling automatic and easy sharing and viewing of large quantities of content based on customized user policies; automatic and easy segmentation of content (e.g., segment level granularity for content sharing), automated viewing control (e.g., automatic confidentiality, privacy, social responsibilities considered) and customized remix creation (e.g., multiple segments corresponding to different criteria included or able to be prioritized based on the preferences of the user requesting access to content). In addition, the segmentation platform 103 enables automated context based remix obfuscation to be performed for affecting the sharing and viewing of content.

The processes described herein for sharing and/or viewing one or more remixes of content based on the preferences of a user may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
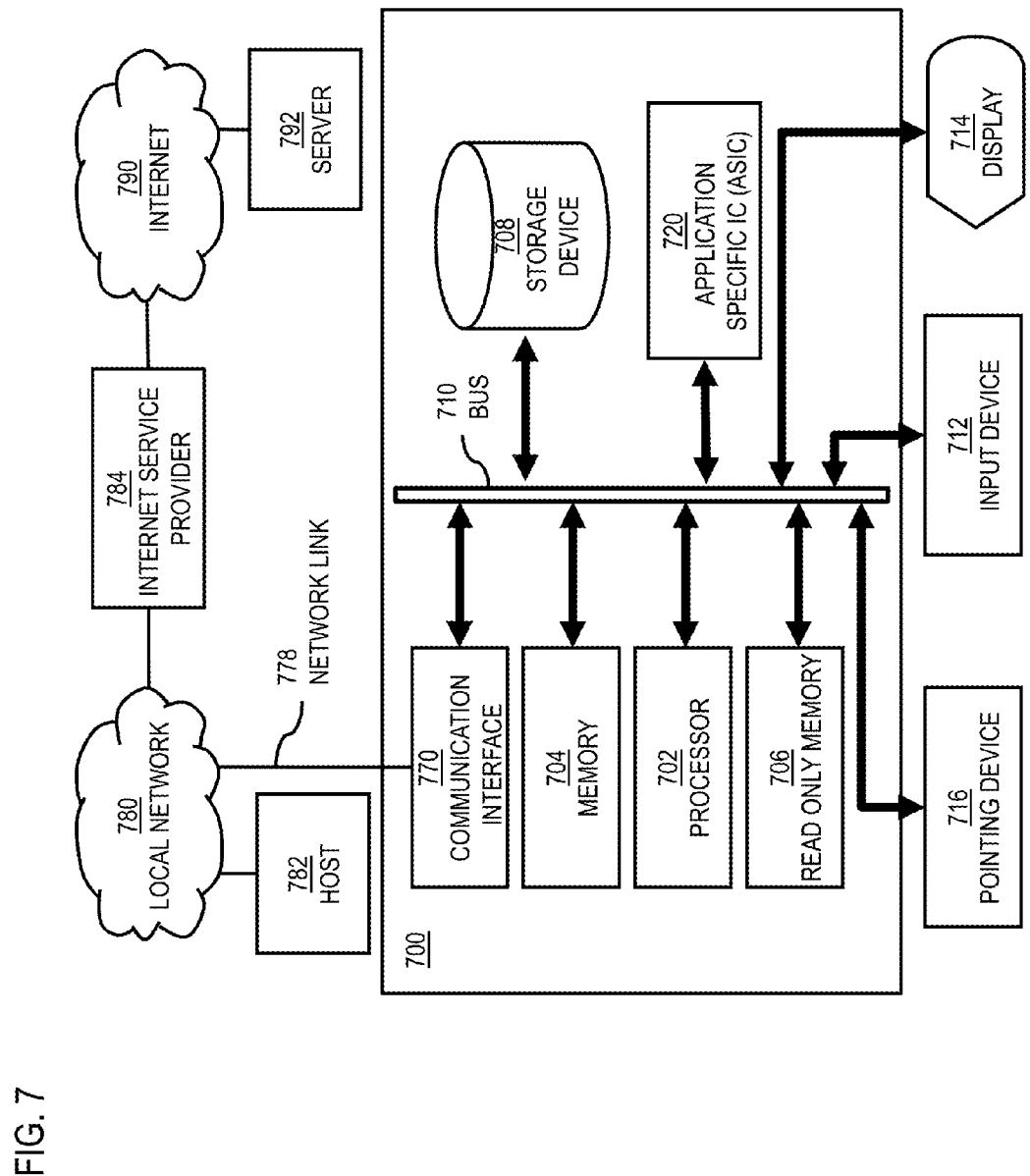
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to share and/or view one or more remixes of content based on the preferences of a user as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of sharing and/or viewing one or more remixes of content based on the preferences of a user.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to share and/or view one or more remixes of content based on the preferences of a user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for sharing and/or viewing one or more remixes of content based on the preferences of a user. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for sharing and/or viewing one or more remixes of content based on the preferences of a user, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for sharing and/or viewing one or more remixes of content based on the preferences of a user to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to share and/or view one or more remixes of content based on the preferences of a user as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of sharing and/or viewing one or more remixes of content based on the preferences of a user.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to share and/or view one or more remixes of content based on the preferences of a user. The memory 805 also stores the data associated with or generated by the execution of the inventive steps.

Figure 9:
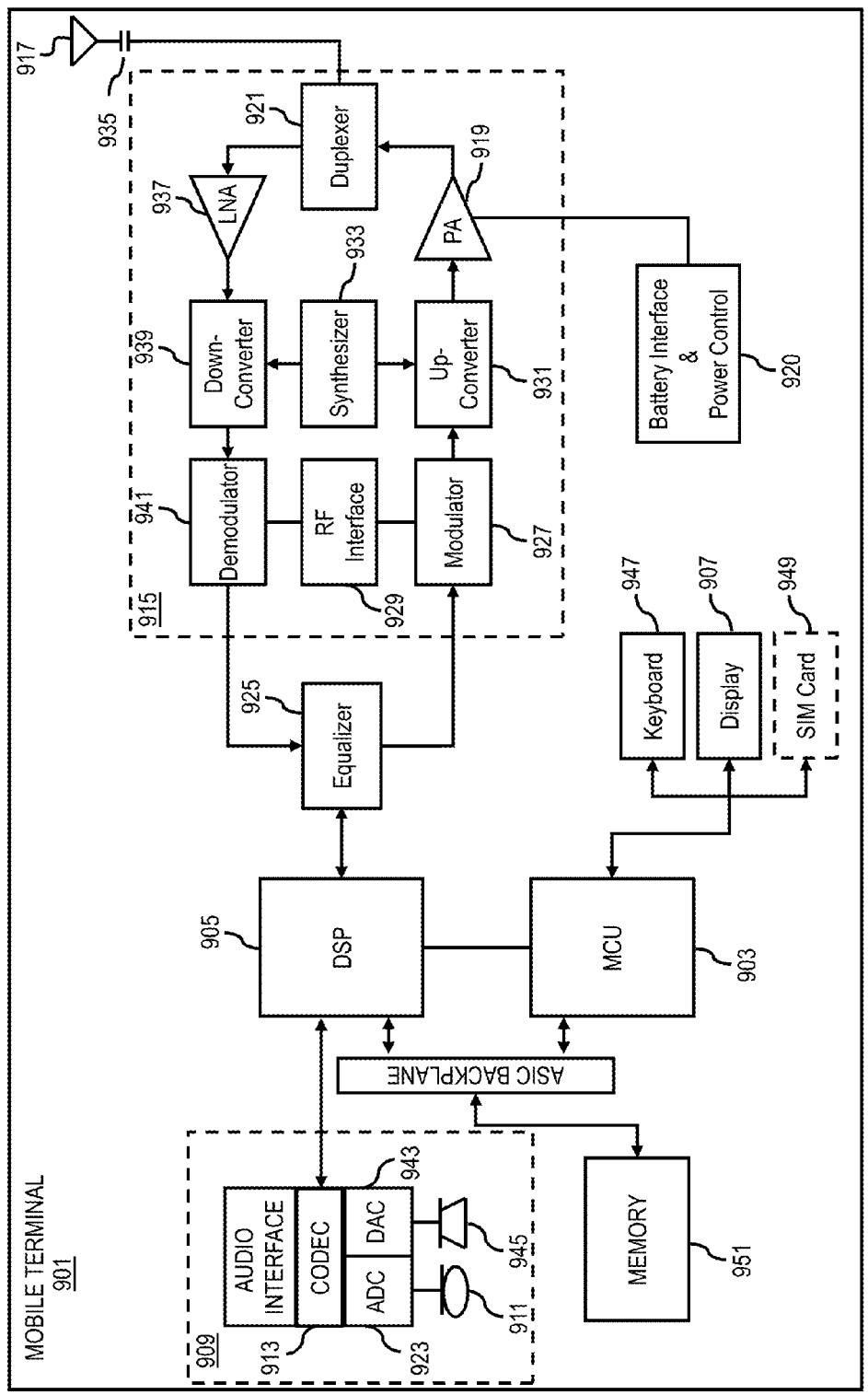
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of sharing and/or viewing one or more remixes of content based on the preferences of a user. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of sharing and/or viewing one or more remixes of content based on the preferences of a user. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to share and/or view one or more remixes of content based on the preferences of a user. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   facilitating a processing of (1) data, (2) information, or (3) at least one signal, or any combination thereof, the (1) data, (2) information, or (3) at least one signal being based, at least in part, on the following:
   a segmentation of content into a plurality of segments, wherein the plurality of segments are associated with a plurality of content labels embedded in the content, each of the plurality of content labels corresponding to a particular segment;
   a processing of the plurality of content labels to cause, at least in part, a selection of at least one subset of the plurality of segments based, at least in part, on profile information, context information, or a combination thereof associated with one or more viewers of the content, one or more owners of the content, one or more sharers of the content, or a combination thereof;
   a rendering of one or more remixes of the content based, at least in part, on the at least one subset;
   at least one determination of one or more temporal discontinuities in the one or more remixes based, at least in part, on the selection of the at least one subset; and
   an insertion of filler content into the one or more remixes based, at least in part, on the one or more temporal discontinuities,
   wherein the at least one subset includes one or more segments and the one or more segments are less than an entirety of the content that is segmented,
   wherein the one or more remixes are fixed at a time of playback,
   wherein the one or more temporal discontinuities occur between at least two segments of the at least one subset when one or more segments of the plurality of segments are not included in the at least one subset, and
   wherein the filler content is inserted prior to playback of the one or more remixes.

2. The method of claim 1, wherein the selection of the at least one subset, the rendering of the one or more remixes, or a combination thereof is further based, at least in part, on one or more content sharing policies, one or more content viewing policies, or a combination thereof associated with the plurality of content labels, the content, the one or more viewers, the one or more owners, the one or more sharers, or a combination thereof.

3. The method of claim 2, wherein the (1) data, (2) information, or (3) at least one signal are further based, at least in part, on the following:
   at least one determination of the one or more content sharing policies, the one or more content viewing policies, or a combination thereof based, at least in part, on one or more social networking groups associated with the one or more viewers, the one or more owners, the one or more sharers, or a combination thereof,
   wherein the one or more content sharing policies, the one or more content viewing policies, or a combination thereof is used to determine which of the one or more remixes to share with the respective one or more social networking groups.

4. The method of claim 2, wherein the one or more content sharing policies, the one or more content viewing policies or a combination thereof include, at least in part, one or more contextual criteria for determining the selection of the at least one subset.

5. The method of claim 4, wherein the one or more contextual criteria include, at least in part, one or more location criteria, one or more temporal criteria, one or more criteria regarding presence of one or more other viewers, one or more device capability criteria, or a combination thereof.

6. The method of claim 2, wherein the (1) data, (2) information, or (3) at least one signal are further based, at least in part, on the following:
   a processing of the profile information to determine one or more profile assignments for the one or more viewers, the one or more owners, the one or more sharers, or a combination thereof; and
   at least one determination of the one or more content sharing policies, the one or more content viewing policies, or a combination thereof based, at least in part, on the one or more profile assignments.

7. The method of claim 2, wherein the (1) data, (2) information, or (3) at least one signal are further based, at least in part, on the following:
   an embedding of the one or more content sharing policies, the one or more content viewing policies, the plurality of content labels, or a combination thereof in the a plurality of segments, the content, the one or more remixes, or a combination thereof.

8. The method of claim 1, wherein the (1) data, (2) information, or (3) at least one signal are further based, at least in part, on the following:
   at least one determination to create the one or more remixes based, at least in part, on one or more temporal criteria related, at least in part, to (a) a duration of the one or more remixes, the plurality of segments, the content, or a combination thereof; (b) a transition interval between the a plurality of segments in the one or more remixes; or (c) a combination thereof.

9. The method of claim 1, wherein the filler content includes, at least in part, interpolated content, advertisement content, or a combination thereof.

10. An apparatus comprising:
at least one processor; and
at least one memory including computer program code for one or more programs,
the at least one memory and the computer program code configured to, with the at least one processor, cause the apparatus to perform at least the following,
cause, at least in part, a segmentation of content into a plurality of segments, wherein the plurality of segments are associated with a plurality of content labels embedded in the content, each of the plurality of content labels corresponding to a particular segment;
process and/or facilitate a processing of the plurality of content labels to cause, at least in part, a selection of at least one subset of the plurality of segments based, at least in part, on profile information, context information, or a combination thereof associated with one or more viewers of the content, one or more owners of the content, one or more sharers of the content, or a combination thereof;
cause, at least in part, a rendering of one or more remixes of the content based, at least in part, on the at least one subset;
determine one or more temporal discontinuities in the one or more remixes based, at least in part, on the selection of the at least one subset; and
cause, at least in part, an insertion of filler content into the one or more remixes based, at least in part, on the one or more temporal discontinuities,
wherein the at least one subset includes one or more segments and the one or more segments are less than an entirety of the content that is segmented,
wherein the one or more remixes are fixed at a time of playback,
wherein the one or more temporal discontinuities occur between at least two segments of the at least one subset when one or more segments of the plurality of segments are not included in the at least one subset, and
wherein the filler content is inserted prior to playback of the one or more remixes.

11. The apparatus of claim 10, wherein the selection of the at least one subset, the rendering of the one or more remixes, or a combination thereof is further based, at least in part, on one or more content sharing policies, one or more content viewing policies, or a combination thereof associated with the plurality of content labels, the content, the one or more viewers, the one or more owners, the one or more sharers, or a combination thereof.

12. The apparatus of claim 11, wherein the apparatus is further caused to:
determine the one or more content sharing policies, the one or more content viewing policies, or a combination thereof based, at least in part, on one or more social networking groups associated with the one or more viewers, the one or more owners, the one or more sharers, or a combination thereof,
wherein the one or more content sharing policies, the one or more content viewing policies, or a combination thereof is used to determine which of the one or more remixes to share with the respective one or more social networking groups.

13. The apparatus of claim 11, wherein the one or more content sharing policies, the one or more content viewing policies or a combination thereof include, at least in part, one or more contextual criteria for determining the selection of the at least one subset.

14. The apparatus of claim 13, wherein the one or more contextual criteria include, at least in part, one or more location criteria, one or more temporal criteria, one or more criteria regarding presence of one or more other viewers, one or more device capability criteria, or a combination thereof.

15. The apparatus of claim 11, wherein the apparatus is further caused to:
process and/or facilitate a processing of the profile information to determine one or more profile assignments for the one or more viewers, the one or more owners, the one or more sharers, or a combination thereof; and
determine the one or more content sharing policies, the one or more content viewing policies, or a combination thereof based, at least in part, on the one or more profile assignments.

16. The apparatus of claim 11, wherein the apparatus is further caused to:
cause, at least in part, an embedding of the one or more content sharing policies, the one or more content viewing policies, the plurality of content labels, or a combination thereof in the plurality of segments, the content, the one or more remixes, or a combination thereof.

17. The apparatus of claim 10, wherein the apparatus is further caused to:
determine to create the one or more remixes based, at least in part, on one or more temporal criteria related, at least in part, to (a) a duration of the one or more remixes, the plurality of segments, the content, or a combination thereof; (b) a transition interval between the plurality of segments in the one or more remixes; or (c) a combination thereof.

18. The apparatus of claim 10, wherein the filler content includes, at least in part, interpolated content, advertisement content, or a combination thereof.

* * * * *